(12) United States Patent
Chiong

(10) Patent No.: US 11,005,762 B2
(45) Date of Patent: May 11, 2021

(54) APPLICATION DELIVERY CONTROLLER AND GLOBAL SERVER LOAD BALANCER

(71) Applicant: A10 NETWORKS, INC., San Jose, CA (US)

(72) Inventor: John Chiong, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 254 days.

(21) Appl. No.: 15/833,222

(22) Filed: Dec. 6, 2017

(65) Prior Publication Data

US 2018/0097736 A1    Apr. 5, 2018

Related U.S. Application Data

(63) Continuation of application No. 13/791,760, filed on Mar. 8, 2013, now Pat. No. 9,900,252.

(51) Int. Cl.
*H04L 12/803* (2013.01)
*H04L 12/841* (2013.01)

(52) U.S. Cl.
CPC ............ *H04L 47/125* (2013.01); *H04L 47/28* (2013.01)

(58) Field of Classification Search
CPC .............................. H04L 47/125; H04L 47/28
See application file for complete search history.

(56) References Cited

U.S. PATENT DOCUMENTS

| 5,218,602 | A | 6/1993 | Grant et al. |
| 5,774,660 | A | 6/1998 | Brendel et al. |
| 5,935,207 | A | 8/1999 | Logue et al. |
| 5,958,053 | A | 9/1999 | Denker |
| 5,995,981 | A | 11/1999 | Wikstrom |
| 6,003,069 | A | 12/1999 | Cavill |
| 6,047,268 | A | 4/2000 | Bartoli et al. |
| 6,131,163 | A | 10/2000 | Wiegel |

(Continued)

FOREIGN PATENT DOCUMENTS

| CN | 1372662 | 10/2002 |
| CN | 1449618 | 10/2003 |

(Continued)

OTHER PUBLICATIONS

Abe, et al., "Adaptive Split Connection Schemes in Advanced Relay Nodes," IEICE Technical Report, 2010, vol. 109 (438), pp. 25-30.

(Continued)

*Primary Examiner* — Jerry B Dennison
(74) *Attorney, Agent, or Firm* — Keith Kline; The Kline Law Firm PC

(57) ABSTRACT

Application Delivery Controller (ADC), Global Server Load Balancer (GSLB), and methods for their operation in data networks are disclosed. The methods for load balancing may include receiving a query concerning a host name from a client, determining that there are two or more host servers associated with the host name, measuring various metrics associated with each of the two or more host servers and a local Doman Name Server (DNS), and based at least in part on the measurement, selecting a host server among the two or more host servers. The load balancing may also be based on a measured round trip time.

20 Claims, 6 Drawing Sheets

(56) References Cited

U.S. PATENT DOCUMENTS

| | | | |
|---|---|---|---|
| 6,178,160 B1 * | 1/2001 | Bolton | H04L 29/06 370/255 |
| 6,219,706 B1 | 4/2001 | Fan et al. | |
| 6,259,705 B1 | 7/2001 | Takahashi et al. | |
| 6,321,338 B1 | 11/2001 | Porras et al. | |
| 6,374,300 B2 | 4/2002 | Masters | |
| 6,459,682 B1 | 10/2002 | Ellesson et al. | |
| 6,587,866 B1 | 7/2003 | Modi et al. | |
| 6,748,414 B1 | 6/2004 | Bournas | |
| 6,772,334 B1 | 8/2004 | Glawitsch | |
| 6,779,017 B1 | 8/2004 | Lamberton et al. | |
| 6,779,033 B1 | 8/2004 | Watson et al. | |
| 6,928,482 B1 * | 8/2005 | Ben Nun | H04L 67/1008 370/235 |
| 6,952,728 B1 | 10/2005 | Alles et al. | |
| 7,010,605 B1 | 3/2006 | Dharmarajan | |
| 7,013,482 B1 | 3/2006 | Krumel | |
| 7,058,718 B2 | 6/2006 | Fontes et al. | |
| 7,069,438 B2 | 6/2006 | Balabine et al. | |
| 7,076,555 B1 | 7/2006 | Orman et al. | |
| 7,143,087 B2 | 11/2006 | Fairweather | |
| 7,181,524 B1 | 2/2007 | Lele | |
| 7,218,722 B1 | 5/2007 | Turner et al. | |
| 7,228,359 B1 | 6/2007 | Monteiro | |
| 7,234,161 B1 | 6/2007 | Maufer et al. | |
| 7,236,457 B2 | 6/2007 | Joe | |
| 7,254,133 B2 | 8/2007 | Govindarajan et al. | |
| 7,269,850 B2 | 9/2007 | Govindarajan et al. | |
| 7,277,963 B2 | 10/2007 | Dolson et al. | |
| 7,301,899 B2 | 11/2007 | Goldstone | |
| 7,308,499 B2 | 12/2007 | Chavez | |
| 7,310,686 B2 | 12/2007 | Uysal | |
| 7,328,267 B1 | 2/2008 | Bashyam et al. | |
| 7,334,232 B2 | 2/2008 | Jacobs et al. | |
| 7,337,241 B2 | 2/2008 | Boucher et al. | |
| 7,343,399 B2 | 3/2008 | Hayball et al. | |
| 7,349,970 B2 | 3/2008 | Clement et al. | |
| 7,370,353 B2 | 5/2008 | Yang | |
| 7,391,725 B2 | 6/2008 | Huitema et al. | |
| 7,398,317 B2 | 7/2008 | Chen et al. | |
| 7,423,977 B1 * | 9/2008 | Joshi | H04J 3/0682 370/231 |
| 7,430,755 B1 | 9/2008 | Hughes et al. | |
| 7,454,500 B1 * | 11/2008 | Hsu | H04L 67/1008 709/203 |
| 7,463,648 B1 | 12/2008 | Eppstein et al. | |
| 7,467,202 B2 | 12/2008 | Savchuk | |
| 7,472,190 B2 | 12/2008 | Robinson | |
| 7,492,766 B2 | 2/2009 | Cabeca et al. | |
| 7,506,360 B1 | 3/2009 | Wilkinson et al. | |
| 7,509,369 B1 | 3/2009 | Tormasov | |
| 7,512,980 B2 | 3/2009 | Copeland et al. | |
| 7,533,409 B2 | 5/2009 | Keane et al. | |
| 7,552,323 B2 | 6/2009 | Shay | |
| 7,584,262 B1 | 9/2009 | Wang et al. | |
| 7,584,301 B1 | 9/2009 | Joshi | |
| 7,590,736 B2 | 9/2009 | Hydrie et al. | |
| 7,613,193 B2 | 11/2009 | Swami et al. | |
| 7,613,822 B2 | 11/2009 | Joy et al. | |
| 7,673,072 B2 | 3/2010 | Boucher et al. | |
| 7,675,854 B2 | 3/2010 | Chen et al. | |
| 7,703,102 B1 | 4/2010 | Eppstein et al. | |
| 7,707,295 B2 | 4/2010 | Szeto et al. | |
| 7,711,790 B1 | 5/2010 | Barrett et al. | |
| 7,739,395 B1 | 6/2010 | Parlamas et al. | |
| 7,747,748 B2 | 6/2010 | Allen | |
| 7,751,409 B1 | 7/2010 | Carolan | |
| 7,765,328 B2 | 7/2010 | Bryers et al. | |
| 7,792,113 B1 | 9/2010 | Foschiano et al. | |
| 7,808,994 B1 | 10/2010 | Vinokour et al. | |
| 7,826,487 B1 | 11/2010 | Mukerji et al. | |
| 7,881,215 B1 | 2/2011 | Daigle et al. | |
| 7,948,952 B2 | 5/2011 | Hurtta et al. | |
| 7,970,934 B1 | 6/2011 | Patel | |
| 7,979,585 B2 | 7/2011 | Chen et al. | |
| 7,983,258 B1 | 7/2011 | Ruben et al. | |
| 7,990,847 B1 | 8/2011 | Leroy et al. | |
| 7,991,859 B1 | 8/2011 | Miller et al. | |
| 8,019,870 B1 | 9/2011 | Eppstein et al. | |
| 8,032,634 B1 | 10/2011 | Eppstein et al. | |
| 8,090,866 B1 | 1/2012 | Bashyam et al. | |
| 8,122,116 B2 | 2/2012 | Matsunaga et al. | |
| 8,159,961 B1 * | 4/2012 | Rai | H04L 67/42 370/252 |
| 8,179,809 B1 | 5/2012 | Eppstein et al. | |
| 8,185,651 B2 | 5/2012 | Moran et al. | |
| 8,191,106 B2 | 5/2012 | Choyi et al. | |
| 8,224,971 B1 | 7/2012 | Miller et al. | |
| 8,266,235 B2 | 9/2012 | Jalan et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,499,093 B2 | 7/2013 | Grosser et al. | |
| 8,539,075 B2 | 9/2013 | Bali et al. | |
| 8,554,918 B1 * | 10/2013 | Douglis | G06F 11/3433 709/226 |
| 8,554,929 B1 | 10/2013 | Szeto et al. | |
| 8,560,693 B1 | 10/2013 | Wang et al. | |
| 8,584,199 B1 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2 | 6/2014 | Casado et al. | |
| 8,782,221 B2 | 7/2014 | Han | |
| 8,813,180 B1 | 8/2014 | Chen et al. | |
| 8,826,372 B1 | 9/2014 | Chen et al. | |
| 8,879,427 B2 | 11/2014 | Krumel | |
| 8,885,463 B1 | 11/2014 | Medved et al. | |
| 8,897,154 B2 | 11/2014 | Jalan et al. | |
| 8,965,957 B2 | 2/2015 | Barros | |
| 8,977,749 B1 | 3/2015 | Han | |
| 8,990,262 B2 | 3/2015 | Chen et al. | |
| 9,094,364 B2 | 7/2015 | Jalan et al. | |
| 9,106,561 B2 | 8/2015 | Jalan et al. | |
| 9,154,577 B2 | 10/2015 | Jalan et al. | |
| 9,154,584 B1 | 10/2015 | Han | |
| 9,215,275 B2 | 12/2015 | Kannan et al. | |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,270,774 B2 | 2/2016 | Jalan et al. | |
| 9,338,225 B2 | 5/2016 | Jalan et al. | |
| 9,350,744 B2 | 5/2016 | Chen et al. | |
| 9,356,910 B2 | 5/2016 | Chen et al. | |
| 9,386,088 B2 | 7/2016 | Zheng et al. | |
| 9,497,201 B2 | 11/2016 | Chen et al. | |
| 9,531,846 B2 | 12/2016 | Han et al. | |
| 9,544,364 B2 | 1/2017 | Jalan et al. | |
| 9,602,442 B2 | 3/2017 | Han | |
| 9,609,052 B2 | 3/2017 | Jalan et al. | |
| 9,705,800 B2 | 7/2017 | Sankar et al. | |
| 9,843,484 B2 | 12/2017 | Sankar et al. | |
| 9,900,252 B2 * | 2/2018 | Chiong | H04L 47/125 |
| 9,906,422 B2 | 2/2018 | Jalan et al. | |
| 9,906,591 B2 | 2/2018 | Jalan et al. | |
| 2001/0049741 A1 * | 12/2001 | Skene | H04L 45/00 709/232 |
| 2002/0032777 A1 | 3/2002 | Kawata et al. | |
| 2002/0078164 A1 | 6/2002 | Reinschmidt | |
| 2002/0091844 A1 | 7/2002 | Craft et al. | |
| 2002/0103916 A1 | 8/2002 | Chen et al. | |
| 2002/0133491 A1 | 9/2002 | Sim et al. | |
| 2002/0138618 A1 | 9/2002 | Szabo | |
| 2002/0143991 A1 | 10/2002 | Chow et al. | |
| 2002/0178259 A1 | 11/2002 | Doyle et al. | |
| 2002/0191575 A1 | 12/2002 | Kalavade et al. | |
| 2002/0194335 A1 | 12/2002 | Maynard | |
| 2002/0194350 A1 | 12/2002 | Lu et al. | |
| 2003/0009591 A1 | 1/2003 | Hayball et al. | |
| 2003/0014544 A1 | 1/2003 | Pettey | |
| 2003/0023711 A1 | 1/2003 | Parmar et al. | |
| 2003/0023873 A1 | 1/2003 | Ben-Itzhak | |
| 2003/0035409 A1 | 2/2003 | Wang et al. | |

(56) References Cited

U.S. PATENT DOCUMENTS

| | | |
|---|---|---|
| 2003/0035420 A1 | 2/2003 | Niu |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0047751 A1* | 3/2006 | Chen ............... H04L 47/125 709/205 |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0089793 A1* | 4/2009 | Nandagopal ............ H04W 8/12 718/105 |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0131639 A1* | 5/2010 | Narayana ............ H04L 67/142 709/224 |
| 2010/0162378 A1 | 6/2010 | Jayawardena et al. |
| 2010/0169477 A1* | 7/2010 | Stienhans ............ G06F 9/5083 709/224 |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |

(56) References Cited

U.S. PATENT DOCUMENTS

| | | |
|---|---|---|
| 2011/0145324 A1 | 6/2011 | Reinart et al. |
| 2011/0153831 A1* | 6/2011 | Mutnuru ............... H04L 69/167 709/226 |
| 2011/0153834 A1 | 6/2011 | Bharrat |
| 2011/0153840 A1* | 6/2011 | Narayana ............ H04L 67/1029 709/227 |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0226810 A1 | 9/2011 | Wang |
| 2011/0276695 A1* | 11/2011 | Maldaner ............... H04L 41/00 709/226 |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066360 A1* | 3/2012 | Ghosh ................. H04L 43/0864 709/223 |
| 2012/0066371 A1 | 3/2012 | Patel et al. |
| 2012/0084460 A1 | 4/2012 | McGinnity et al. |
| 2012/0106346 A1* | 5/2012 | Aguirre ................. H04W 28/08 370/237 |
| 2012/0106355 A1 | 5/2012 | Ludwig |
| 2012/0117571 A1 | 5/2012 | Davis et al. |
| 2012/0144014 A1 | 6/2012 | Nathan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0054809 A1* | 2/2013 | Urmanov ............... G06F 9/505 709/226 |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0124713 A1 | 5/2013 | Feinberg et al. |
| 2013/0148500 A1 | 6/2013 | Sonoda et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0082626 A1* | 3/2014 | Busaba ................. G06F 9/38 718/104 |
| 2014/0143423 A1* | 5/2014 | Arya ................. G06F 9/505 709/226 |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0310391 A1* | 10/2014 | Sorenson, III .......... H04L 45/24 709/223 |
| 2014/0310417 A1* | 10/2014 | Sorenson, III .......... H04L 45/24 709/226 |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0006728 A1* | 1/2015 | Parakh ................. H04L 67/1025 709/226 |
| 2015/0006729 A1* | 1/2015 | Parakh ................. H04L 67/10 709/226 |
| 2015/0019732 A1* | 1/2015 | Parakh ................. H04L 67/10 709/226 |
| 2015/0095494 A1* | 4/2015 | Lin ................. H04L 67/1036 709/225 |
| 2015/0098333 A1* | 4/2015 | Lin ................. H04L 67/101 370/235 |
| 2015/0156223 A1 | 6/2015 | Xu et al. |
| 2015/0161411 A1* | 6/2015 | Shikfa ................. H04L 9/0894 726/27 |
| 2015/0215436 A1 | 7/2015 | Kancherla |
| 2015/0237173 A1 | 8/2015 | Virkki et al. |
| 2015/0281016 A1* | 10/2015 | Guerin ................. H04L 67/1008 709/224 |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0350048 A1 | 12/2015 | Sampat et al. |
| 2015/0350379 A1 | 12/2015 | Jalan et al. |
| 2016/0042014 A1 | 2/2016 | Jalan et al. |
| 2016/0044095 A1 | 2/2016 | Sankar et al. |
| 2016/0088074 A1 | 3/2016 | Kannan et al. |
| 2016/0094470 A1 | 3/2016 | Skog |
| 2016/0139910 A1 | 5/2016 | Ramanathan et al. |
| 2016/0164792 A1 | 6/2016 | Oran |

FOREIGN PATENT DOCUMENTS

| | | |
|---|---|---|
| CN | 1529460 | 9/2004 |
| CN | 1575582 | 2/2005 |
| CN | 1714545 | 12/2005 |
| CN | 1725702 | 1/2006 |
| CN | 101004740 | 7/2007 |
| CN | 101094225 | 12/2007 |
| CN | 101163336 | 4/2008 |
| CN | 101169785 | 4/2008 |
| CN | 101189598 | 5/2008 |
| CN | 101193089 | 6/2008 |
| CN | 101247349 | 8/2008 |
| CN | 101261644 | 9/2008 |
| CN | 102143075 | 8/2011 |
| CN | 102546590 | 7/2012 |
| CN | 102571742 A | 7/2012 |
| CN | 102577252 A | 7/2012 |
| CN | 102918801 A | 2/2013 |
| CN | 103533018 | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 | 7/2015 |
| CN | 102577252 B | 3/2016 |
| CN | 102918801 B | 5/2016 |
| CN | 102571742 B | 7/2016 |
| EP | 1209876 | 5/2002 |
| EP | 1770915 | 4/2007 |
| EP | 1885096 | 2/2008 |
| EP | 2296313 | 3/2011 |
| EP | 2577910 | 4/2013 |
| EP | 2622795 | 8/2013 |
| EP | 2647174 | 10/2013 |
| EP | 2760170 A1 | 7/2014 |
| EP | 2772026 | 9/2014 |
| EP | 2901308 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 1/2014 |
| HK | 1198565 | 5/2015 |
| HK | 1198848 | 6/2015 |

(56) References Cited

FOREIGN PATENT DOCUMENTS

| | | |
|---|---|---|
| HK | 1199153 | 6/2015 |
| HK | 1199779 | 7/2015 |
| HK | 1200617 | 8/2015 |
| IN | 3764CHN2014 | 9/2015 |
| IN | 261CHE2014 | 1/2016 |
| IN | 1668CHENP2015 | 7/2016 |
| JP | G0997233 | 4/1997 |
| JP | H1196128 | 4/1999 |
| JP | H11338836 | 12/1999 |
| JP | 2000276432 | 10/2000 |
| JP | 2000307634 | 11/2000 |
| JP | 2001051859 | 2/2001 |
| JP | 2001298449 | 10/2001 |
| JP | 2002091936 | 3/2002 |
| JP | 2003141068 | 5/2003 |
| JP | 2003186776 | 7/2003 |
| JP | 2005141441 | 6/2005 |
| JP | 2006332825 | 12/2006 |
| JP | 2008040718 | 2/2008 |
| JP | 2009500731 | 1/2009 |
| JP | 2013528330 | 7/2013 |
| JP | 2014504484 | 2/2014 |
| JP | 2014143686 | 8/2014 |
| JP | 2015507380 | 3/2015 |
| JP | 5855663 | 2/2016 |
| JP | 5913609 | 4/2016 |
| JP | 5946189 | 7/2016 |
| JP | 5963766 | 8/2016 |
| KR | 20080008340 | 1/2008 |
| KR | 100830413 | 5/2008 |
| KR | 20130096624 | 8/2013 |
| KR | 101576585 | 12/2015 |
| KR | 101632187 | 6/2016 |
| KR | 101692751 | 1/2017 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 | 9/2004 |
| WO | WO2006098033 | 9/2006 |
| WO | WO2008053954 | 5/2008 |
| WO | WO2008078593 | 7/2008 |
| WO | WO2011049770 | 4/2011 |
| WO | WO2011079381 | 7/2011 |
| WO | WO2011149796 | 12/2011 |
| WO | WO2012050747 | 4/2012 |
| WO | WO2012075237 | 6/2012 |
| WO | WO2012083264 | 6/2012 |
| WO | WO2012097015 | 7/2012 |
| WO | WO2013070391 | 5/2013 |
| WO | WO2013081952 | 6/2013 |
| WO | WO2013096019 | 6/2013 |
| WO | WO2013112492 | 8/2013 |
| WO | WO2013189024 | 12/2013 |
| WO | WO2014031046 | 2/2014 |
| WO | WO2014052099 | 4/2014 |
| WO | WO2014088741 | 6/2014 |
| WO | WO2014093829 | 6/2014 |
| WO | WO2014138483 | 9/2014 |
| WO | WO2014144837 | 9/2014 |
| WO | WO2014179753 | 11/2014 |
| WO | WO2015153020 | 10/2015 |

OTHER PUBLICATIONS

Cardellini, et al., "Dynamic Load Balancing on Web-Server Systems," IEEE Internet Computing, 1999, vol. 3 (3), pp. 28-39.

FreeBSD, "tcp—TCP Protocal," Linux Programmes Manual [online], 2007, [retrieved on Apr. 13, 2016], Retreived from the Internet: <https://www.freebsd.org/cgi/man.cgi?query=tcp&apropos=0&Lsektion=7&manpath=SuSe+Linux%2Fi386+11.0&format=asci>.

Gite, "Linux Tune Network Stack (Buffers Size) to Increase Networking Performance," nixCraft [online], 2009, [retrieved on Apr. 13, 2016], Retreived from the Internet: <URL:http://www.cyberciti.biz/faq/linux-tcp-tuning/>.

Goldszmidt, et al., "NetDispatcher: A TCP Connection Router," IBM Researc Report, RC 20853, 1997, pp. 1-31.

Kjaer, et al., "Resource Allocation and Disturbance Rejection in Web Servers Using SLAs and Virtualized Servers," IEEE Transactions on Network Service Management, 2009, vol. 6 (4), pp. 226-239.

Koike, et al., "Transport Middleware for Network-Based Control," IEICE Technical Report, 2000, vol. 100 (53), pp. 13-18.

Noguchi, "Realizing the Highest Level "Layer 7" Switch"= Totally Managing Network Resources, Applications, and Users =, Computer & Network LAN, 2000, vol. 18 (1), pp. 109-112.

Ohnuma, "AppSwitch: 7th Layer Switch Provided with Full Setup and Report Tools," Interop Magazine, 2000, vol. 10 (6), pp. 148-150.

Sharifian, et al., "An Approximation-Based Load-Balancing Algorithm with Admission Control for Cluster Web Servers with Dynamic Workloads," The Journal of Supercomputing, 2010, vol. 53 (3), pp. 440-463.

Spatscheck, et al., "Optimizing TCP Forwarder Performance," IEEE/ACM Transactions on Networking, 2000, vol. 8 (2), pp. 146-157.

Search Report and Written Opinion dated Aug. 4, 2014 for PCT Application No. PCT/US2014/021411.

Takahashi, "The Fundamentals of the Windows Network: Understanding the Mystery of the Windows Network from the Basics," Network Magazine, 2006, vol. 11 (7), pp. 32-35.

Yamamoto, et al., "Performance Evaluation of Window Size in Proxy-Based TCP for Multi-Hop Wireless Networks," IPSJ SIG Technical Reports, 2008, vol. 2008 (44), pp. 109-114.

\* cited by examiner

500

|  | Address #1 | Address #2 | . . . | Address #n |
|---|---|---|---|---|
| Metric #1 | $M_{11}$ | $M_{21}$ |  | $M_{n1}$ |
| Metric #2 | $M_{12}$ | $M_{22}$ |  | $M_{n2}$ |
| Metric #3 | $M_{13}$ | $M_{23}$ |  | $M_{n3}$ |
| Metric #4 | $M_{14}$ | $M_{24}$ |  | $M_{n4}$ |
| . . . |  |  |  |  |

FIG. 5

APPLICATION DELIVERY CONTROLLER AND GLOBAL SERVER LOAD BALANCER

CROSS-REFERENCE TO RELATED APPLICATIONS

This application is a continuation of and claims the priority benefit of U.S. patent application Ser. No. 13/791,760 filed on Mar. 8, 2013, entitled "Application Delivery Controller and Global Server Load Balancer," the disclosure of which is incorporated herein by reference.

BACKGROUND

The present disclosure relates generally to data processing, more specifically to Application Delivery Controllers (ADC) and Global Server Load Balancers (GSLB).

Websites, web and mobile applications, cloud computing, and various web and mobile services have been rising in popularity. Some examples of fast growing consumer services include smart phone applications, location based services, navigation services, e-book services, video applications, music applications, Internet television services, and so forth. Subsequently, more and more servers are deployed within data networks including the Internet to accommodate the increasing computing and data storage needs. These servers are typically arranged in data centers or web farms, which may include ADCs, GSLB and/or server load balancers (SLBs).

Conventionally, an ADC is a network device disposed in a datacenter and part of an application delivery network (ADN). The ADC may allow performing common tasks, normally done by web servers, in an effort to remove some load from the web servers. ADCs are typically placed between the firewall/router and the host (web) servers. In addition, conventional ADCs may include various features providing for compression, caching, connection multiplexing, application layer security, and content switching. These features may be combined with basic server load balancing, content manipulation, advanced routing strategies, and highly configurable server health monitoring.

Additionally, ADCs may manage load balancing and delivery of service sessions from client host computers to servers based at least in part on incoming service requests. As more servers are deployed, additional ADC's may be deployed. Similarly, as more servers are pooled together within the data center or spread across multiple data centers to provide scalability, ADCs may become bottlenecks slowing data transmissions between peers on the network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to another aspect of the present disclosure, a GSLB and method of its operation are provided. Specifically, there is provided a method for load balancing between host servers of a data network, the method including receiving a query concerning a host name from a client, determining that there are two or more host servers associated with the host name, measuring round trip times associated with site switches and a Doman Name Server (DNS) assigned to the client, and based at least in part on the measurements, selecting a host server among the two or more host servers. The method may further include providing a network address of the selected host server in the DNS response. The round trip time may include a time for exchange of at least one message from multiple site switches and the Local DNS servers. According to this method, the host server associated with the shortest round trip time is selected from among the two or more host servers.

According to yet another aspect of the present disclosure, another GSLB and method of its operation are provided. In particular, there may be provided a method for load balancing among host servers of a data network. The method may include measuring multiple performance metrics concerning a plurality of switches, each of which may be associated with one or more host servers. The method may further include determining a plurality of network addresses associated with the one or more host servers and storing the multiple performance metrics in association with the plurality of network addresses in a table. The multiple performance metrics may include a plurality of round trip times from a plurality of plurality of switches associated with one or more host servers and a DNS associated with the client. The multiple performance metrics may also include application health metrics, load metrics, proximity metrics, weighted preferences metrics. The method may further include receiving a domain name query from a client or a DNS, retrieving a plurality of network addresses associated with the domain name query from the table, retrieving multiple performance metrics for each network address from the table, randomly selecting one of the network addresses, and calculating a score associated with the multiple performance metrics related to the selected network address.

Furthermore, the method may include determining that the score for the randomly selected network address meets or exceeds a predetermined threshold score and, based on the determination, returning the randomly selected network address to the client or the DNS. If the score for the randomly selected network address does not meet the predetermined threshold score, the method may proceed with removing the randomly network address from the table (although the address need not be removed) and continuing with randomly selecting one of the remaining network addresses from the table to repeat the steps of calculating a score and matching it to the threshold value. If no addresses meet or exceed the threshold than the method may decrease the predetermined threshold and repeat the above steps.

The systems and methods of the present disclosure may be practiced with various electronic devices including, for example, host servers, web farms, switches, routers, client computers such as laptop computers, desktop computers, tablet computers, cellular phones, and other consumer electronic user devices having network connectivity. These and other embodiments are described further below with references to the figures.

BRIEF DESCRIPTION OF THE DRAWINGS

Embodiments are illustrated by way of example, and not limitation, in the figures of the accompanying drawings, in which like references indicate similar elements.

FIG. 5 is a flow chart of an exemplary method for collecting performance metrics associated with multiple host servers and/or switches.

DETAILED DESCRIPTION

Figure 1:
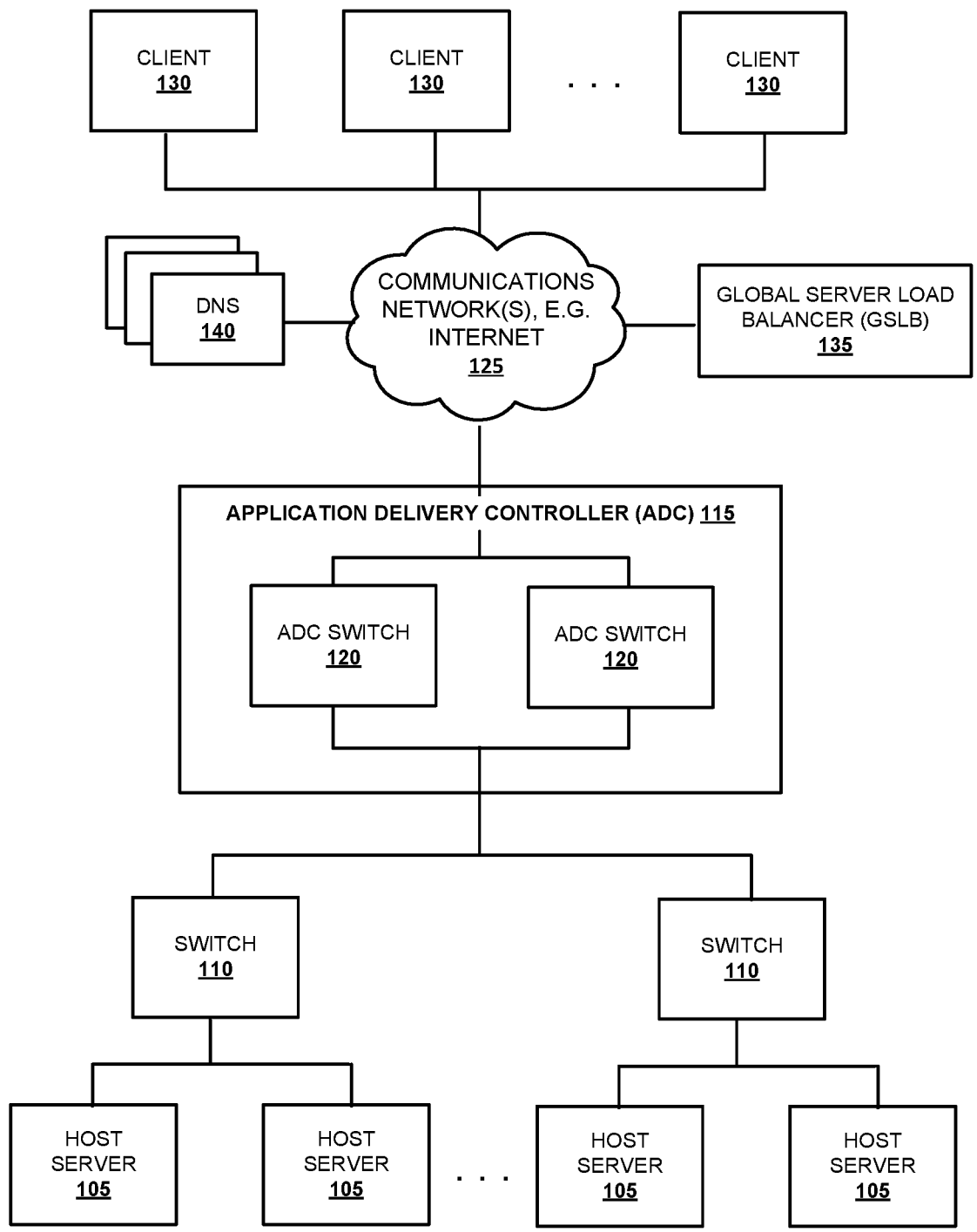
FIG. 1 is a block diagram of a network suitable for implementing one or more methods of the present disclosure.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices like FPGA's, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, tablet computer, laptop computer, smartphone and so forth.

The present technology provides various methods for operation of ADCs and GSLBs in data networks such as the Internet including a plurality of switches, routers, virtual switches, web farms, host servers, and other units. The present technology provides enhanced performance of ADC and allows implementing scalable business solutions for any services, applications, clouds and organizations. Furthermore, the present technology provides a scalable, high-performance application networking platform, which can deliver superior reliability and energy efficiency at lower total cost of ownership. ADC can also provide increased infrastructure efficiency, a faster end user experience, comprehensive Layer 4-7 feature set and flexible virtualization technologies such as Virtual Chassis System, multi-tenancy, and more for public, private and hybrid cloud environments. The ADC and GSLB may include software and/or hardware components/platforms that may vary depending on a particular application, performance, infrastructure, network capacity, data traffic parameters, and so forth. Some example topologies for ADC and/or GSLB are described in U.S. utility patent application Ser. No. 13/363,055, filed on Jan. 31, 2012, titled "Virtual application delivery chassis system" (now U.S. Pat. No. 8,266,235), U.S. utility patent application Ser. No. 13/004,861, filed on Jan. 11, 2011, titled "Virtual Application Delivery Chassis System," U.S. utility patent application Ser. No. 13/154,399, filed on Jun. 6, 2011, titled "Synchronization of configuration file of virtual application distribution chassis," U.S. utility patent application Ser. No. 12/958,435, filed on Dec. 2, 2010, titled "System and Method for Distributing Application Traffic to Servers Based on Dynamic Service Response Time," U.S. utility patent application Ser. No. 12/894,142, filed on Sep. 30, 2010, titled "System and method to balance servers based on server load status," all of which are incorporated herein by reference in their entireties.

Turning now to FIG. 1, a high-level block diagram of a network topology 100 suitable for implementing one or more methods of the present disclosure is shown. The network topology 100 shown by FIG. 1 may include a number of host servers 105, a number of switches 110 combining/coupling the host servers 105 and thus performing Layer 2 aggregation and corresponding switching. The topology 100 may further include an ADC 115 including one (or more) ADC switches 120. The ADC switches may operate in different modes. such as standalone, active/standby mode, Active-Active and others.

Still referring to FIG. 1, the topology 100 may further include a communications network, which may refer to, for example, the Internet, Local Area Network (LAN), Wide Area Network (WAN), Internet, a cellular network, a telephone network, or any other switched network or their combinations. There is also a plurality of clients 130, which may include end user computers, mobile phones, thin clients, and so forth. There are also one or more Local DNS Server which may be associated with one or more clients 130 and/or one or more host servers 105. As shown in FIG. 1, the topology may include a GSLB 135, which may employ one or more of the methods disclosed herein.

Generally speaking, load balancing is a technique that may be used for distributing the workload evenly across clients 130, networks 125, host servers 105, and other networked resources. The load balancing may enhance utilization of resources and enable maximize throughput with minimum response time, hence avoiding overloading of a single server. GSLB may be considered an extension of the load balancing. With this technology, network traffic may be distributed among different web farms, data centers, and host servers 105 located at different geographical locations. This technology may be highly efficient in avoiding local downtimes and downtimes. Furthermore, as will be appreciated by those skilled in the art, GSLB 135 may act as a master to monitor "health" and responsiveness of other sites hosted by the host servers 105. The GSLB may include redirection of service requests to other nearby host servers 105 if one of the host servers 105 does not respond timely. Furthermore, this technique may allow forwarding visitor requests to the host server 105 located most closely geographically to the place from where the request sent. In addition, if a traffic threshold is reached at this host server 105, the service requests may be forwarded to other host server 105 located at a different geographical location.

As will be appreciated by those skilled in the art, these ADC switches 120 may operate in an active mode, backup mode, or some other modes depending on an application. The ADC switches 120 may also provide redundancy protection and failover protection for selected networks or parts of the network 125. The ADC switches 120 may also report their status (i.e., current operating mode) to selected network elements or other switches 110, 120.

Figure 2:
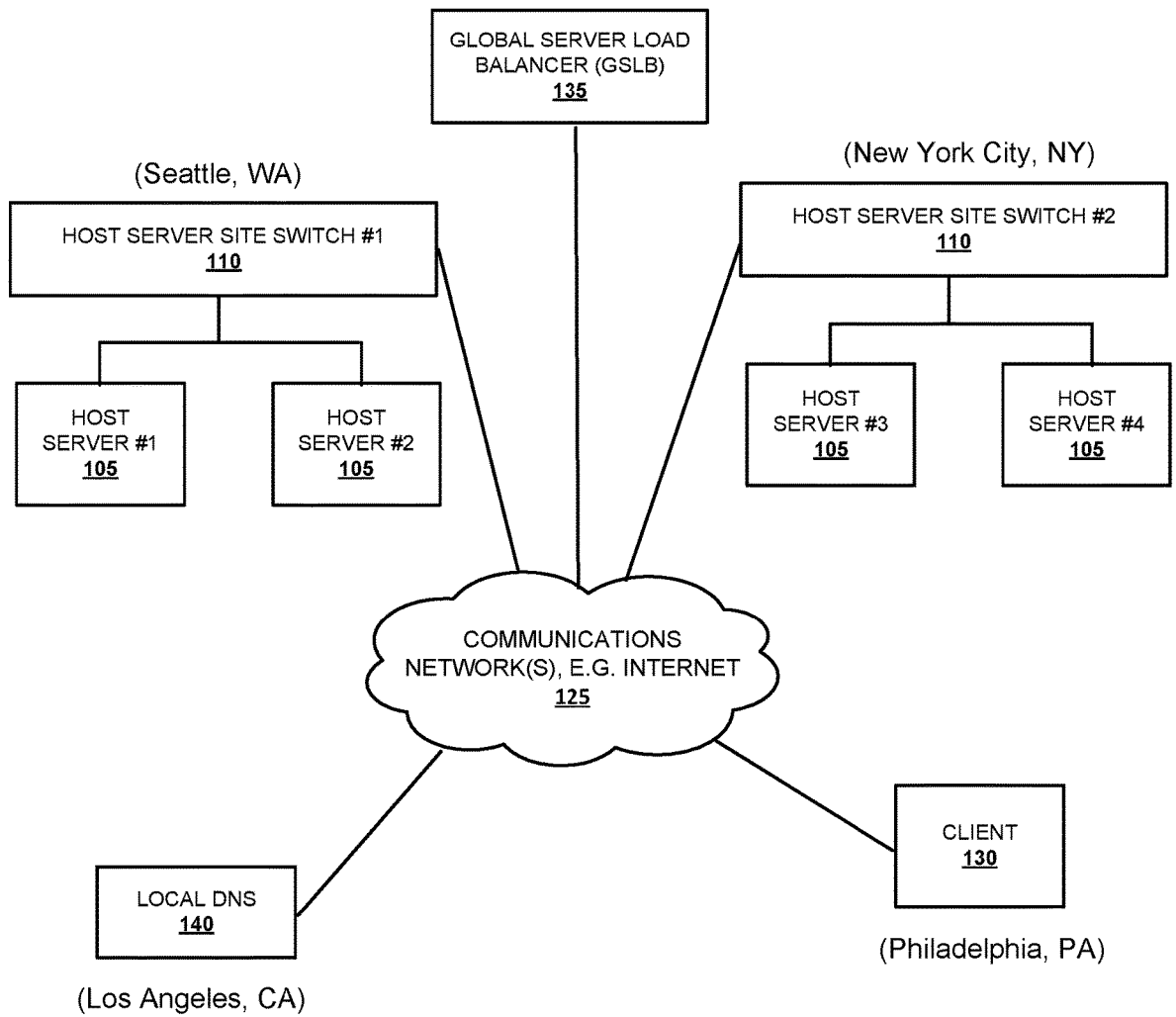
FIG. 2 is a flow chart of an exemplary method for operating ADC.

FIG. 2 illustrates a block diagram of an exemplary network topology 200 in which various embodiments of the present technology may be practiced. Specifically, FIG. 2 illustrates a specific embodiment of the network topology 100 shown generally in FIG. 1 as well as operations of the GSLB 135.

As shown in FIG. 2, the networked elements may include various arrangements within the network topology and may be located at different geographic locations. Specifically, there may be multiple host server site switches 110 coupling many host servers 105 to the client 130 via the communications network 125. As discussed above, the GSLB 135 may perform load balancing of traffic among the host servers 105. As such, the time for exchanging of a message between the host server site switch 110 and client device 130 may be variable based on at least the capacity of the host servers, the overall traffic load, and the time delay of transmitting a message through the network 125.

In the configuration shown in FIG. 2, the resources or data requested by the client 130, or the resources or data to be transmitted to the client 130 may be stored in host servers 105. As illustrated in the figure, Host Server 1, Host Server 2, and corresponding Switch 1 may be located in Seattle, Wash., while Host Server 3, Host Server 4, and corresponding Switch 2 may be located in New York City, N.Y. By way of example, the client 130 may be located in Pennsylvania, Pa. and the corresponding local DNS 140 may be located in Los Angeles, Calif. In such configurations, the GSLB 135 may perform corresponding measurements to determine which host server 105 should be used for transfer data to the client 130. The measurements, in some embodiments, include round trip times of exchange of a message between the switches 110 and the local DNS 140. In this configuration, the round trip time may be a function of network or switch capacity, the overall traffic load, time delay of transmitting a message through the network, and so forth. Thus, as will be appreciated by those skilled in the art, the time for exchanging a message between Switch 1 and the local DNS 140 is substantially a measurement of the time to send a message between Seattle and Los Angeles. The local DNS 140 in Los Angeles is much closer geographically to Switch 1 in Seattle, than the client 130 is in Philadelphia. Thus, the time for a message to travel from Switch 1 to the local DNS 140 and back should be less than the time for a message to travel from Switch 1 to the client 130 and back. In this regard, the GSLB 135 may select "Switch 1" 110 to make data transmission to the client 130, and not the host servers 105 or Switch 2, which located closer to the client 130. These principles are further described in the following figure.

Figure 3:
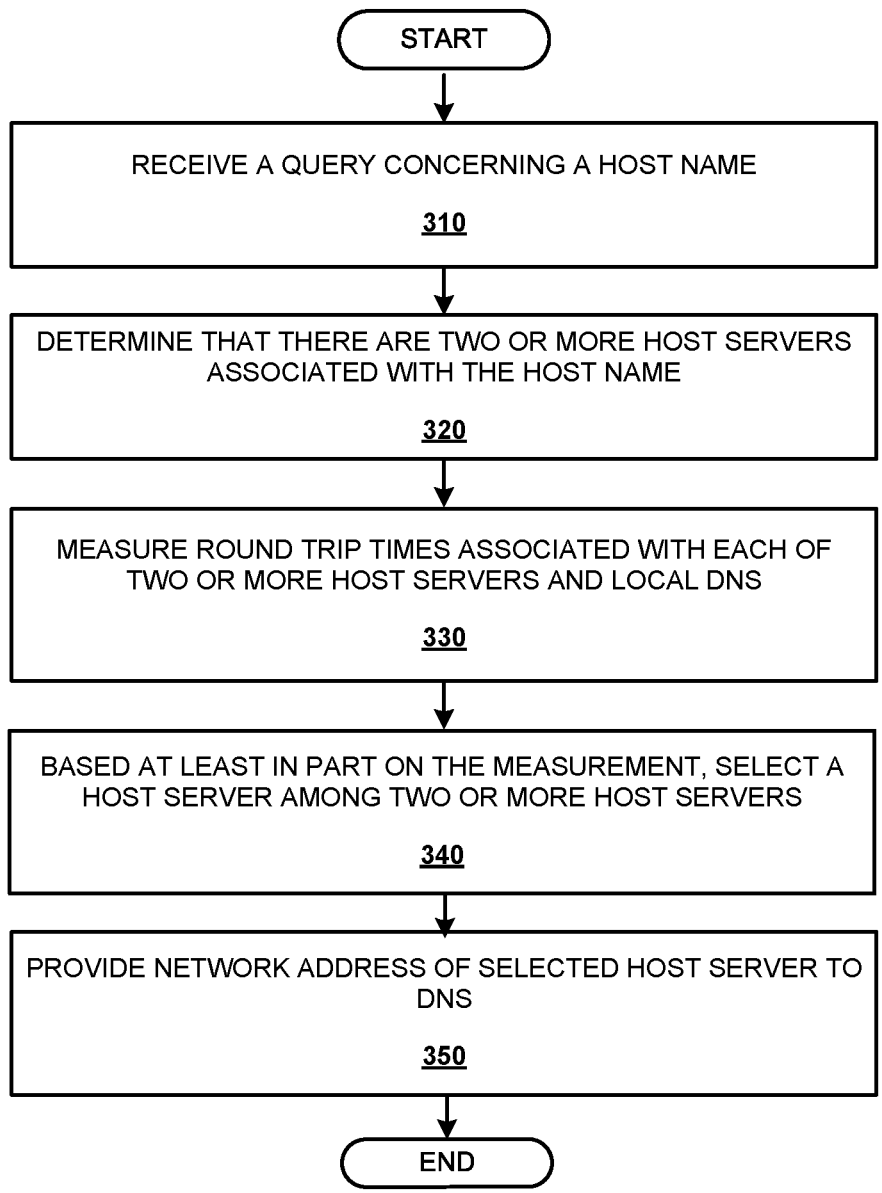
FIG. 3 is another block diagram of an exemplary network suitable for implementing one or more methods of the present disclosure.

FIG. 3 illustrates a flow chart of an example method 300 for load balancing between host servers 105 of a data network 125. The method 300 may be practiced by the GSLB 135 as described above with references to FIGS. 1 and 2.

The method 300 may commence in operation 310 with the GSLB 135 receiving a query concerning a host name from a client 130. This query, in certain embodiments, may be generated by the ADC 115 so as to initiate the load balancing procedure.

In operation 320, the GSLB 135 may determine that there are two or more of host servers 105 associated with the host name. If there is just one host server 105, the load balancing procedure is not performed. Otherwise, the method 300 may proceed to operation 330, so that the GSLB 135 may measure round trip times (or other similar metrics) associated with each of the two or more host servers 105 and the LDNS 140. More specifically, round trip times may be measured for exchange of at least one message from each of the two or more host servers 105 and the LDNS 140. In certain embodiments, the round trip time may also include a time for exchange of at least one message from one or more switches 110 associated with the two or more host servers 105 and the LDNS 140.

At operation 340, based at least in part on the measurement, the GSLB 135 may select the host server 105, from the two or more host servers 105, which is associated with the shortest round trip time measured. At operation 350, the GSLB 135 may provide a network address of the selected host server 105 to the LDNS 140 or the client 130 so that data may be transmitted from the selected host server 105 to the client 130.

In certain additional embodiments, the measured round trip times may be stored in the GSLB 135 and then retrieved upon further request. This procedure may eliminate frequent redundant operations and thus may save some computational and networked resources.

Figure 4:
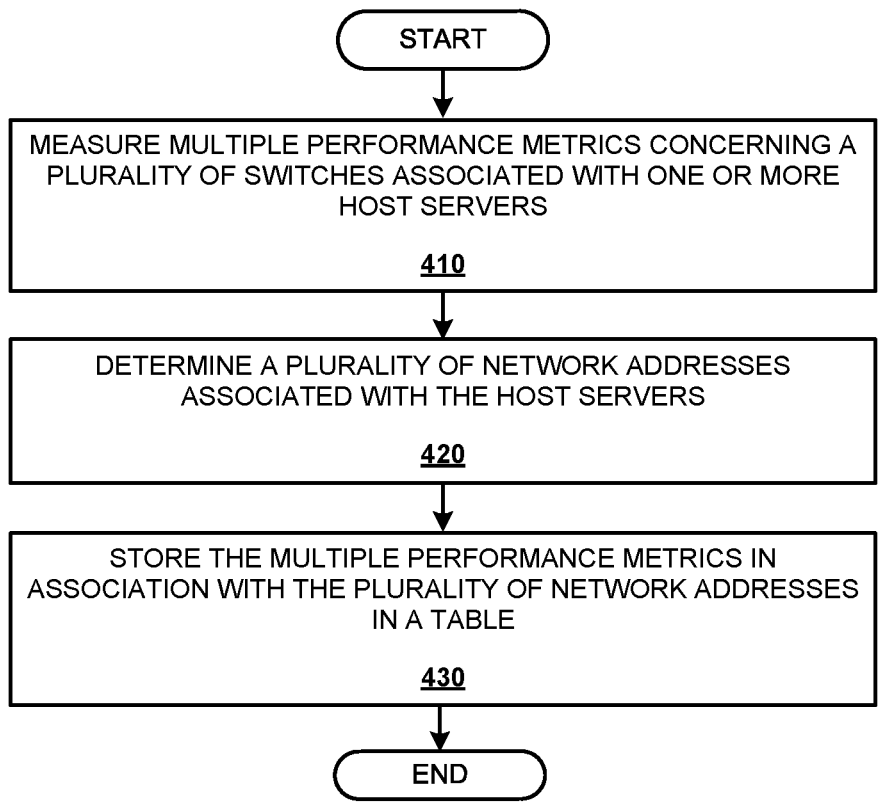
FIG. 4 is a flow chart of an exemplary method for load balancing between host servers of a data network.

According to one or more embodiments of the present disclosure, the global load balancing process may rely not only on real time measurement of various parameters, such as described above, but also on various measurements performed in advance. FIG. 4 shows a flow chart of an example method 400 for collecting performance metrics associated with certain host servers 105 and/or switches 110. The method 400 may be practiced by the ADC 115 and/or the GSLB 135 and/or similar electronic devices as discussed above.

The method 400 may include operation 410, at which the GSLB 135 (or similar device) may measure multiple performance metrics regarding a plurality of switches 110, and each switch 110 may be associated with one or more host servers 105. The performance metrics may include a plurality of round trip times from the plurality of switches 110 associated with one or more host servers 105 and a DNS 140 associated with the client 130. In certain embodiments, the performance metrics may include one or more of the following: application health metrics, load metrics, and proximity metrics.

Turning again to FIG. 4, in operation 420 the GSLB 135 may also determine a plurality of network addresses associated with the one or more host servers 105, with respect to which the measurements have been performed. In operation 530, the GSLB 135 may store the multiple performance metrics in association with the plurality of network addresses in a table. An example of such a table is shown in FIG. 5.

In particular, FIG. 5 shows a high level diagram of example table 500 of aggregated performance metrics associated with certain host servers 105 and/or switches 110. The table cross-references measured metrics with networked addresses. The metrics may be binary or measured values may be provided. The table 500 may be used in the process described below with reference to FIG. 6.

Figure 6:
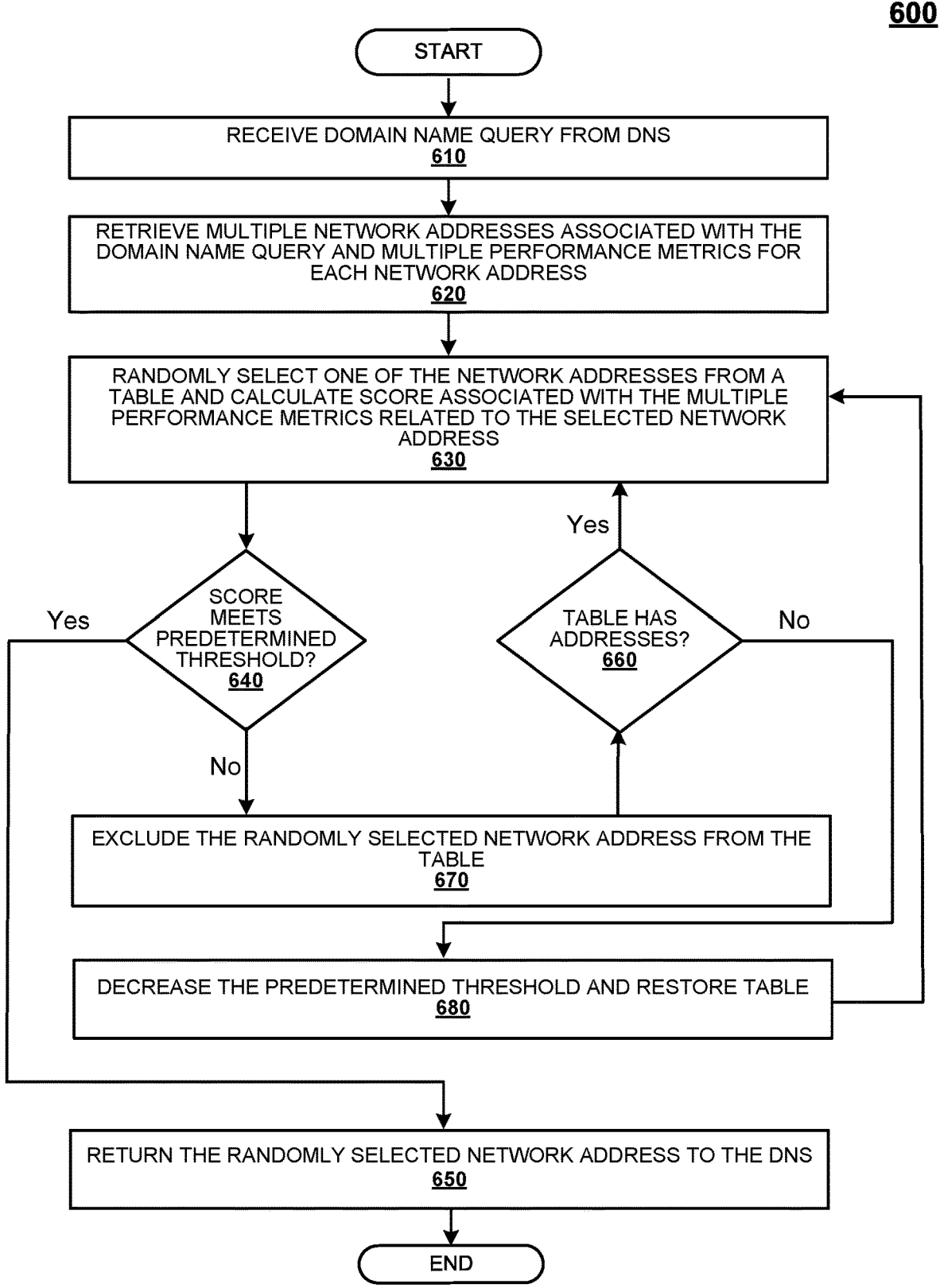
FIG. 6 is a high-level diagram of exemplary table of aggregated performance metrics associated with multiple host servers and/or switches.

FIG. 6 illustrates a flow chart of an example method 600 for load balancing among host servers 105 of a data network 125. The method 600 may be practiced by the GSLB 135 as described above with reference to FIGS. 1 and 2.

Method 600 may commence in operation 610 with the GSLB 135 receiving a domain name query from a client 130 or a DNS 140. In operation 620, the GSLB 135 may further retrieve a plurality of network addresses associated with the domain name query as well as multiple performance metrics for each network address. The retrieving may be performed from the table 600 as shown in FIG. 6.

In operation 630, the GSLB 135 may randomly select one of the network addresses from the table 600 and calculate a score associated with the multiple performance metrics related to the selected network address. In operation 640, the GSLB 135 may further compare the score for the randomly selected network address to a predetermined threshold value. If it is determined that the score meets or exceeds the threshold value, the method 600 may proceed to operation 650, where the GSLB 135 may transmit the randomly selected network address to the client 130 or the DNS 140. Otherwise, if it is determined that the score does not meet or exceed the threshold value, the method 600 may proceed to operation 670, where the GSLB 135 may remove the randomly selected network address from the table 600 and then, in operation 660, check if there are any other network addresses remaining in the table 600. If there are remaining network addresses in the table 600, the method 600 may proceed to operation 630 and repeat random selection of another network address, its corresponding score, and continue with the determination at operation 640. Otherwise, if there are no remaining network addresses in the table 600, the method proceeds to operation 680, when the GSLB 135 may decrease the threshold value a certain amount and then the method 600 may return to operations 630 and 640 until a network address generating a qualifying score is selected.

Accordingly, the present technology for global load balancing sets a threshold score and evaluates a randomly accessed network address from a plurality of network addresses against the threshold score until an address is found that meets or exceeds the threshold score. There is no comparison of network addresses against each other, and thus there is no ranking or ordering of network addresses and no generation of an ordered list of network addresses. This approach significantly simplifies and facilitates the load balancing process.

It should be noted that the systems and methods herein may return multiple network addresses in response to a given domain name query. Each of the returned addresses will be randomly selected and non-ordered, but each returned address will meet the threshold limit. If it is desirable in a given application that multiple network addresses be returned, the qualification procedure described above may be performed multiple times. Alternatively, a randomly selected network address associated with a given domain name query may be stored for future reference. Should the same domain name query then be re-submitted, so that the query is a recognized query, the systems and methods described herein may return one or more stored addresses in addition to one or more newly selected network addresses.

Thus, methods and systems for operation of the ADC and GSLB have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for load balancing among host servers of a data network, the method comprising:
    receiving, by a Global Server Load Balancer (GSLB), a domain name query from a client; retrieving, by the GSLB, a plurality of network addresses associated with the domain name query, the plurality of network addresses being associated with a plurality of host servers; upon the retrieving the plurality of network addresses;
    determining, by the GSLB, at least a round trip time between a Local Domain Name Server (LDNS) associated with the client and each of the plurality of host servers associated with the plurality of network addresses, the determining including exchanging at least one message between the LDNS and each of the plurality of host servers; and
    determining, by the GSLB, geographic distances between the LDNS and each of the plurality of host servers;
    based on the determining of both the round trip time and the geographic distances, storing, by the GSLB, the round trip time for each of the plurality of network addresses and the geographic distances to a metrics table, the metrics table storing multiple performance metrics for each of the plurality of network addresses;
    randomly selecting, by the GSLB, a network address of the plurality of network addresses, the randomly selected network address having performance metrics selected from the multiple performance metrics;
    scoring the performance metrics of the randomly selected network address to obtain an aggregated metrics score of the randomly selected network address;
    determining, by the GSLB, whether the aggregated metrics score of the randomly selected network address meets a predetermined threshold; and
    based on the determination that the aggregated metrics score meets the predetermined threshold, returning, by the GSLB, the randomly selected network address.

2. The method of claim 1, wherein the determining that the aggregated metrics score of the randomly selected network address meets the predetermined threshold includes:
    determining that the aggregated metrics score is higher than the predetermined threshold.

3. The method of claim 1, wherein the GSLB is configured to randomly select a further network address of the plurality of network addresses based on the determination that the aggregated metrics score of the randomly selected network address does not meet the predetermined threshold.

4. The method of claim 2, further comprising:
    determining, by the GSLB, aggregated metrics scores for all of the plurality of network addresses;
    determining, by the GSLB, that the aggregated metrics scores for all of the plurality of network addresses do not meet the predetermined threshold; and
    decreasing, by the GSLB, the predetermined threshold.

5. The method of claim 2, wherein the domain name query is received from a client or a Domain Name Server (DNS).

6. The method of claim 5, further comprising:
    determining, by the GSLB, a plurality of performance metrics associated with a plurality of switches, wherein each of the plurality of switches is associated with one or more host servers;
    determining, by the GSLB, multiple network addresses associated with the one or more host servers; and
    storing, by the GSLB, the plurality of performance metrics in association with the multiple network addresses in a table.

7. The method of claim 5, further comprising:
    randomly selecting, by the GSLB, a further network address of the plurality of network addresses, the randomly selected further network address having further performance metrics selected from the multiple performance metrics;
    scoring the further performance metrics of the randomly selected further network address to obtain a further aggregated metrics score of the randomly selected further network address;
    based on the multiple performance metrics, determining, by the GSLB, that the further aggregated metrics score of the randomly selected further network address meets the predetermined threshold; and based on the determination, returning, by the GSLB, the randomly selected further network address so that at least two randomly selected network addresses are returned to the client or the DNS, the at least two randomly selected network addresses including the randomly selected network address and the randomly selected further network address.

8. The method of claim 5, further comprising:

receiving a recognized domain name query;

randomly selecting, by the GSLB, at least one new randomly selected network address, the least one new randomly selected network address having further performance metrics selected from the multiple performance metrics;

scoring the further performance metrics of the least one new randomly selected network address to obtain a further aggregated metrics score of the least one new randomly selected network address;

based on the multiple performance metrics, determining, by the GSLB, that the further aggregated metrics score of the least one new randomly selected further network address meets the predetermined threshold; and based on the determination, returning both the at least one new randomly selected network address and the randomly selected network address to the client or the DNS.

9. The method of claim 6, wherein the multiple performance metrics includes a plurality of round trip times from the plurality of switches associated with the one or more host servers and the LDNS associated with the client.

10. The method of claim 1, wherein the multiple performance metrics include one or more of the following: application health metrics, proximity metrics, and weighted preferences metrics.

11. A method for load balancing among host servers of a data network, the method comprising:

receiving, by a global server load balancer (GSLB), a query concerning a host name from a client;

determining, by the GSLB, that there are two or more site switches and two or more host servers associated with the host name;

determining, by the GSLB, a round trip time between a Local Domain Name Server (LDNS) assigned to the client and each of the two or more site switches, the determining including exchanging at least one message between the LDNS and each of the two or more site switches and determining, by the GSLB, geographic distances between the LDNS and each of the two or more site switches;

based on the determining of both the round trip time and the geographic distances, storing, by the GSLB, the round trip time for each of the two or more site switches and the geographic distances to a metrics table, the metrics table storing multiple performance metrics for each of the two or more site switches;

randomly selecting, by the GSLB, a host server from the two or more host servers, the randomly selected host server being associated with a site switch of the two or more site switches;

scoring, by the GSLB, the multiple performance metrics of the site switch to obtain an aggregated metrics score of the site switch;

determining, by the GSLB, that the aggregated metrics score of the site switch meets a predetermined threshold; and based on the determination, returning, by the GSLB, a network address of the randomly selected host server associated with the site switch.

12. The method of claim 11, further comprising providing the network address of the randomly selected host server to the LDNS.

13. The method of claim 11, wherein each of the round trip times is a time for an exchange of at least one message from each of the two or more site switches associated with the two or more host servers and the LDNS.

14. The method of claim 11, wherein each of the round trip times is a time for an exchange of at least one message from each of the two or more host servers and the LDNS.

15. The method of claim 11, further comprising transmitting data from the randomly selected host server to the client.

16. The method of claim 11, further comprising:

storing the round trip times associated with the two or more host servers in the GSLB; retrieving, by the GSLB, at least one of the round trip times in response to a further query.

17. The method of claim 11, wherein the query concerning the host name is generated by an Application Delivery Controller (ADC) associated with the one or more host servers.

18. The method of claim 11, wherein the randomly selected host server is associated with a shortest round trip time of the round trip times.

19. The method of claim 11, further comprising:

randomly selecting, by the GSLB, a further host server from the two or more host servers, the randomly selected further host server being associated with a further site switch of the two or more site switches;

scoring the multiple performance metrics of the further site switch to obtain a further aggregated metrics score of the further site switch;

determining, by the GSLB, that the further aggregated metrics score of the further site switch meets the predetermined threshold; and based on the determination, returning, by the GSLB, the further network address of the randomly selected further host server so that at least two randomly selected network addresses are returned to the client or the LDNS, the at least two randomly selected network addresses including the randomly selected network address and the randomly selected further network address.

20. The method of claim 11, further comprising: receiving a recognized query concerning the host name;

randomly selecting, by the GSLB, at least one new randomly selected host server, the at least one new randomly selected host server being associated with a further site switch of the two or more site switches;

scoring the performance metrics of the further site switch to obtain a further aggregated metrics score of the further site switch;

determining, by the GSLB, that the further aggregated metrics score of the further site switch meets the predetermined threshold; and based on the determination, returning both at least one new network address of the at least one new randomly selected host server and the network address of the randomly selected host server to the client or the LDNS.

* * * * *